July 12, 1949.  R. O. WILLIAMS ET AL  2,475,767
METHOD OF MAKING ARTIFICIAL FUEL FROM PAPER
Filed April 30, 1946  3 Sheets-Sheet 1
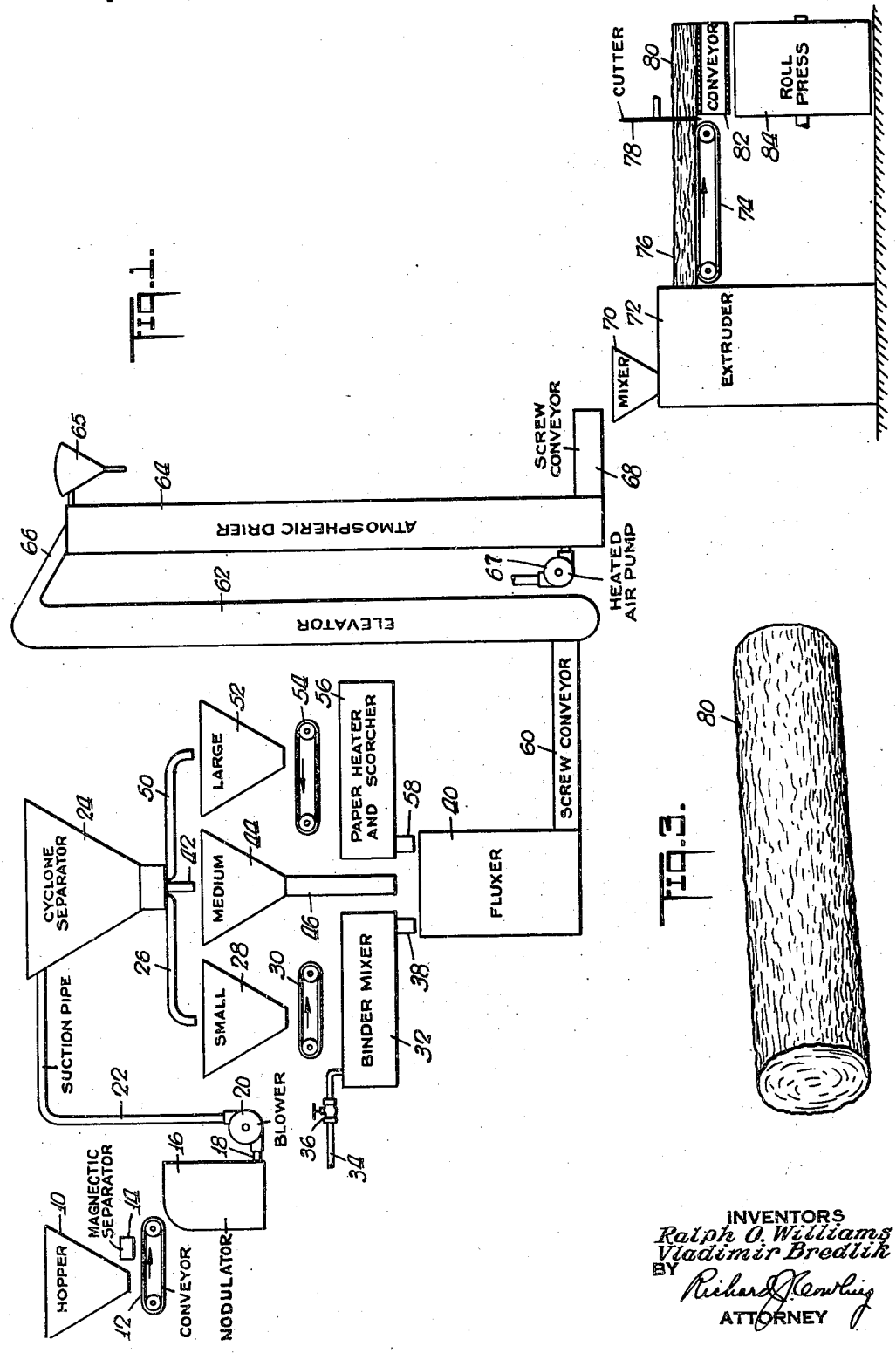
INVENTORS
Ralph O. Williams
Vladimir Bredlik
BY
Richard J. Newling
ATTORNEY July 12, 1949. R. O. WILLIAMS ET AL 2,475,767
METHOD OF MAKING ARTIFICIAL FUEL FROM PAPER
Filed April 30, 1946 3 Sheets-Sheet 2
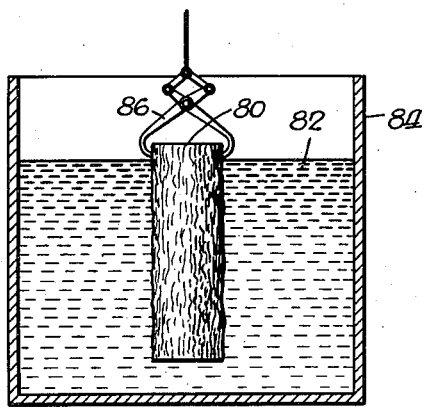
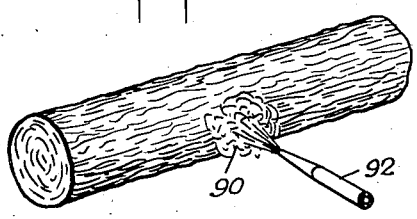
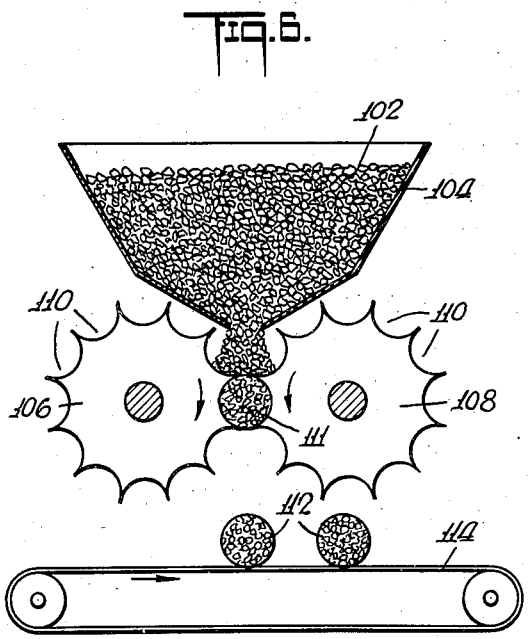
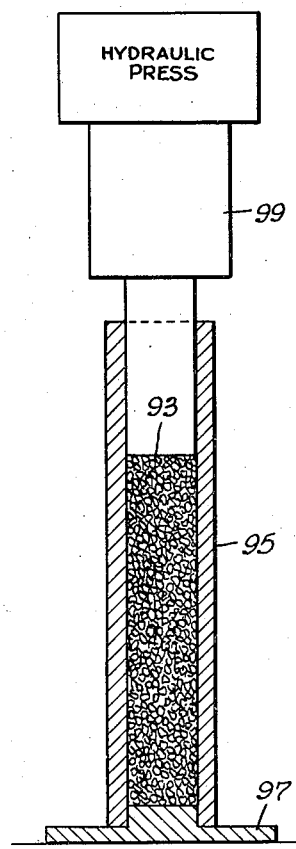
INVENTORS
Ralph O. Williams
Vladimir Bredlik
BY
ATTORNEY

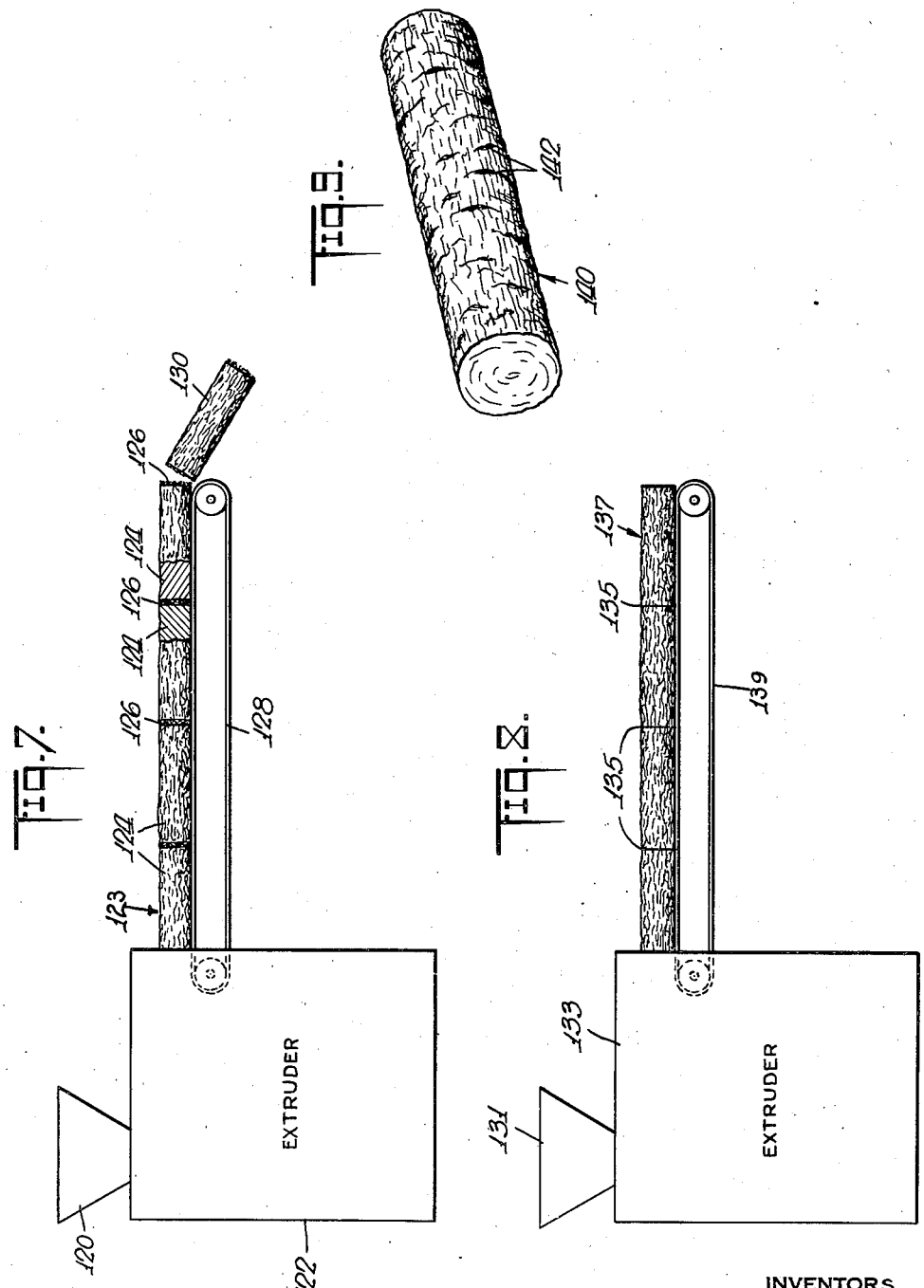

Patented July 12, 1949

2,475,767

UNITED STATES PATENT OFFICE 2,475,767

METHOD OF MAKING ARTIFICIAL FUEL FROM PAPER

Ralph O. Williams, Brooklyn, and Vladimir Bredlik, New York, N. Y., assignors to Williams-Bauer Corporation, New York, N. Y., a corporation of New York Application April 30, 1946, Serial No. 666,052

1 Claim. (Cl. 44—10)

The present invention relates to the manufacture of artificial fuel, and it has particular relation to method of manufacturing artificial fuel from paper in some desired form, such as logs or briquets, suitable for burning in a conventional fireplace.

Heretofore, it has been customary to manufacture artificial fuel in the form of logs or briquets from refuse wood, shavings, sawdust, coal dust, floor sweepings, vegetable matter and the like, but to our knowledge it has never been found feasible or desirable to make such fuel exclusively from paper, and especially waste paper, which, in normal times, is relatively cheap and plentiful.

One of the objects of the present invention is to provide a new and novel treatment of waste papers whereby artificial fuel in the form of logs or briquets will be formed therefrom having substantially the burning qualities and heating value of natural wood fire logs.

Another object of the invention is the provision of a simple, inexpensive and economical method of making durable fire logs or briquets from waste papers which will retain their molded form under varying atmospheric conditions.

A further object of the invention is to provide a simple, inexpensive and economical method of making a durable fire log or briquet from waste papers which will have the outward appearance and characteristics of fireplace wood.

Another object of the invention is to provide a novel and inexpensive method of making artificial fuel from paper in the form of a log or briquet which will be substantially vermin proof, clean and sanitary at all times.

A further object of the invention is to provide a simple, efficient and economical method of combining finely divided or nodulated paper with a suitable binding agent so that the resultant admixture may be molded into an integral form-retaining mass.

Another object of the invention is the provision of a simple, efficient and economical method of providing logs or briquets made from paper with a suitable color and surface design that will simulate the appearance and color of the bark of natural wood.

A further object of the invention is to provide an artificial fuel from nodulated paper made into the form of a log or briquet having a series of radial or transverse fissures spaced throughout its surface area to facilitate combustion.

Another object of the invention is the provision of a simple, efficient and inexpensive method of extruding a continuous length of nodulated paper which is readily separable into sections suitable for use as logs or briquets, which are convenient and easy to handle and of a size suitable for burning in the conventional fireplace.

A further object of the invention is to provide a simple, efficient and economical method of forming logs or briquets by extrusion which comprises the steps of continuously extruding logs or briquets consisting of sections of nodulated paper conglutinated with a suitable binder and sections of dry nodulated paper without binder alternately spaced, whereby the conglutinated logs will be separable at said sections made up of the dry nodulated paper which does not conglutinate.

Another object of the invention is the provision of a simple, efficient and inexpensive method of making logs or briquets from nodulated paper particles coated with a suitable binding agent by extrusion, which consists in extruding the material to a predetermined length, stopping the extrusion and then extruding a second length, and repeating the cycle whereby said continuously extruded form or strip of material will be readily separable into sections radially at the points weakened by interruption of the extrusion.

Other and further objects and advantages of the invention reside in the details of the method of making our artificial fuel, which results in simplicity, economy and efficiency, and which will be apparent from the following description, wherein several embodiments of the invention are shown, reference now being made to the accompanying drawings, forming a part hereof, wherein like numerals indicate like parts, in which:

Figure 1 is a schematic view of a series of apparatus, each being shown diagrammatically, which may be employed in carrying out one continuous method of making artificial fuel from paper in the form of logs or briquets;

Figure 2 is a sectional view, on a slightly larger scale, of one method of treating the molded logs or briquets to provide a combustible surface coating that is impervious to moisture;

Figure 3 is a diagrammatic view, on even a larger scale, of one form of molded log or briquet made in accordance with the principles of the invention.

Figure 4 is a diagrammatic view showing another method of treating a molded log or briquet to provide it with a combustible surface coating that is impervious to moisture;

Figure 5 is a diagrammatic view, on another scale, of a different form of apparatus which may be used in practicing the invention, in which the coated nodulated material mixed with the binder is placed in a hollow mold, having a removable base, and compacted by means of a hydraulic press or ram;

Figure 6 is a diagrammatic view, on a different scale, of another method which may be used to produce artificial logs or briquets from nodulated paper, in which the coated nodulated material mixed with a binder is fed through a conventional roll press and molded into logs or briquets between oppositely driven rollers having aligning pockets therein;

Figure 7 is a diagrammatic view, on still another scale, of a conventional extrusion machine, showing another method of extruding the logs or briquets in a continuous form-retaining mass or strip consisting of sections of nodulated paper conglutinated with a suitable binding agent and sections of dry nodulated paper without binder alternately spaced, whereby the logs formed of the conglutinated sections separate from the continuously extruded strip will be separable into logs or briquets at the sections of untreated nodulated paper;

Figure 8 is a diagrammatic view, on the same scale as Figure 7, of a conventional extrusion machine, showing another method of extruding the shredded paper material with binder in a continuous form-retaining strip, whereby radial weakening fissures are formed at spaced longitudinal intervals therein, which permits subdivision readily without requiring the aid of any cutting tools or other cutting devices; and Figure 9 is a diagrammatic view of another form of molded log or briquet made in accordance with the principles of the invention, whereby a series of relatively small radial fissures are formed throughout the surface area to facilitate burning and enhance its appearance.

Claims to the products illustrated in this application form the subject-matter of a copending application, which is being filed on even date herewith, under Serial No. 666,051.

Waste papers collected from offices, factories, stores and the like consist of many different kinds and grades of paper. These waste papers for the purpose of this invention may be divided into three general classes; to-wit: (1) non-absorbent paper, (2) absorbent paper and (3) a mixture of both non-absorbent and absorbent papers.

Chemical pulp paper is known generally as a paper consisting of cellulose and sizing such as resin, partially saponified resin, clay, kaolin, silicates, synthetic plastics, and the like materials. Such papers are practically impermeable or at best semi-permeable to water, or liquid binders, such as, for example, water soluble silicates, concentrated sulphite liquors, solutions of natural or synthetic resins in mineral, vegetable or essential oils. All such papers may be described aptly as "non-absorbent" papers, and will hereinafter for the purpose of this invention be so referred to in the specification and claims.

Absorbent paper consists of newsprint, cardboard, box-board and the like. Absorbent paper, unlike non-absorbent paper, contains little or no sizing and is highly absorbent to liquids. For the purpose of this invention, all such papers will be referred to hereinafter as "absorbent" papers.

Between the "absorbent" and "non-absorbent" papers, there is a distinct class of paper that is made up of a mixture of non-absorbent and absorbent pulps and papers. This type of paper is partially absorbent to liquids, and will hereinafter for convenience be referred to in this application as "semi-absorbent" paper.

When the various kinds of waste papers are collected, in the normal course of processing or handling, they are sorted or graded into at least the above three named classes. While it is possible to manufacture artificial fuel logs entirely from any one class of paper, it has been found more desirable and practicable to use a mixture of the three kinds of paper in the making of such artificial fuel, and the preferable mixture has been found to consists of approximately seventy percent non-absorbent paper, fifteen percent absorbent paper and fifteen percent semi-absorbent paper. Experiments have shown that this ratio produces the best logs or briquets, and it is easily the most desirable since the average collection of mixed waste papers has approximately these proportions of each therein which means that substantially all of the waste paper gathered in a normal collection may be used advantageously in the making of our artificial fuel.

The sheets or pieces of paper are first placed in a hopper 10 (see Figure 1), which feeds by gravity onto a conventional belt conveyor 12. The belt conveyor 12 carries the paper under a conventional magnetic separator 14, which attracts and separates out any scrap metal, such as paper clips, etc. that might have been contained in the paper. The paper is carried by the belt conveyor 12 to a conventional grinder or nodulator 16. The grinder or nodulator 16 grinds and more importantly tears the sheets or pieces of paper into relatively small particles. It has been found that straight cut particles of waste paper do not produce satisfactory artificial fuel. Straight cut particles of paper do not lend themselves to a proper mixture with a binding agent, are difficult to compress and, in the step of compressing, tend to form wads or layers, which give undesirable physical properties and burning qualities. The sizing on the non-absorbent paper does not permit the binder to soak sufficiently into the paper to bind the various particles together. In the grinding or nodulating of paper, the individual pieces are not only cut into small particles, but they are also torn, stretched and rubbed over and over again until a majority of the sizing materials are freed in the form of relatively fine particles and dust. The grinder 16 has in its bottom a suitable built-in removable screen through which the nodulated particles must pass, and in this way the maximum size of the particles is controlled by using a screen of the proper mesh. After the ground or nodulated paper particles pass through the screen and out of the grinder 16, they are withdrawn into the discharge pipe 18 by means of a conventional pump or blower 20, which also forces and blows the finely nodulated material into the suction pipe 22 leading into a conventional air flotation or cyclone separator 24.

The cyclone separator 24 operates in such a manner as to separate the ground or nodulated particles into one or more classes, which for the purpose of this illustration are three, to-wit: dust, medium size paper particles and large or coarse size paper particles. The dust, which includes the very small or ultra fine paper particles and all of the freed sizing, as well as any dirt or other inert mineral matter contained originally in the waste paper, is conveyed away from the separator 24 through a suitable discharge pipe 26. The discharge pipe 26 delivers the dust to a suitable hopper 28 from which it is discharged by gravity onto a conveyor belt 30 to be delivered thereby into a conventional mechanical binder-mixer 32. While the dust is being agitated in the binder-mixer 32, the required amount of binding material or agent is delivered thereto by means of a pipe 34 from a source of supply (not shown). The delivery pipe 34 is provided with a suitable control valve 36. It has been found by experience that the mixing of the binding material with the nodulated paper is best accomplished by first mixing the ultra fine paper particles and the dust particles with the binding material to form a viscous paste. When there is insufficient dust in the waste paper being ground or nodulated, it has been found that wood pulp will make an excellent substitute or filler therefor in making up the binding paste. The binding paste is delivered through a suitable discharge outlet 38 in the bottom of the binder-mixer 32 into a second mechanical mixer or fluxer 40.

The medium size particles of nodulated paper are conveyed from the cyclone separator 24 through a suitable discharge pipe 42 into a hopper 44, and conveyed therefrom by gravity into the fluxer 40 through a suitable discharge pipe 46.

The larger size or coarse particles of the ground or nodulated paper are withdrawn from the cyclone separator 24 through a discharge pipe 50, which conveys them into a hopper 52 from which they are discharged by gravity onto a conveyor 54. The conveyor 54 transports the material discharged thereon to a conventional paper heater or scorcher 56. The paper heater or scorcher may be of any desired construction capable of heating the contents thereof to a degree of heat sufficient to cause a partial burning or scorching of the individual paper particles. We have found that a temperature between 150 and 180 degrees F. in the heater or scorcher 56 is sufficient to scorch enough of the paper contents thereof to produce a satisfactory color to the finished logs or briquets. When the desired degree of scorching or browning has been accomplished, the material in the scorcher 56 is discharged through the pipe 58 into the fluxer 40. The materials received in the fluxer 40 from the delivery pipes 38, 46 and 58 are now mixed thoroughly mechanically until substantially all of the nodulated particles are coated intimately and the voids are filled with the binding agent. The compounded admixture, consisting of the nodulated paper and binding agent, is removed from the fluxer 40 by means of a conventional screw conveyor 60.

It was found, on many occasions, that the compounded admixture contained too much moisture for molding into form-retaining units resembling logs or briquets, which excessive moisture was often due to the relative humidity of the surrounding atmosphere. In such cases, the compounded material should be treated to remove the excess moisture. There is included diagrammatically in Figure 1 a novel method of treating such an excessively moist admixture to reduce its moisture content to the desired amount, which should be between five and twenty percent by weight, depending on the kind of paper being used, the size of the logs to be made, the density of the logs, amount of pressure available, and the method of compressing. There are so many variables in the making of such logs or briquets that no satisfactory table can be compiled for guiding the operation. The admixture in the fluxer 40 is withdrawn by means of a conventional screw conveyor 60 and discharged into a conventional elevator 62, which in turn delivers the admixture through a suitable gravity discharge pipe 66 whereby it falls into the top of a conventional atmospheric drier 64. The atmospheric drier 64 consists of a vertical tank of conventional construction, having a heated air pump 67 at its base for forcing a current of dry heated air upwardly therethrough. The current of heated air containing the moisture absorbed from the wet-falling admixture leaves the drier 64 at the top through a suitable valved outlet 65. Obviously, the heated air current passing through the drier 64 in a direction counter to the falling admixture particles absorbs moisture from such particles. By controlling the temperature, relative humidity, volume of heated air, etc. passing through the drier 64, the amount of moisture to be removed from the falling admixture particles may be accurately controlled, which in turn governs the amount of moisture remaining in the admixture at the time it is delivered to the extruding machine 72 or other compressing means.

The admixture now having the desired moisture content, which as previously stated is between five and twenty percent by weight, is removed from the bottom of the drier 64 by means of a conventional screw conveyor 68 into a mixing hopper 70, which in turn feeds the admixture into a conventional extruding machine 72. The admixture can be extruded into suitable logs or briquets at varying degrees of pressure from between 250 and 1200 pounds per square inch, depending upon the size and type of log to be produced, the moisture content, temperature, etc. The admixture as it leaves the extruding machine 72 is deposited onto a conveyor 74 in the form of a continuous form-retaining strip 76. The strip 76 may be severed into suitable lengths for logs or briquets by any suitable means. A high speed revolving knife 78 is shown as one method of cutting the extruded material 76 into suitable lengths for the fireplace. The severed sections or pieces 80 fall onto a conveyor 82 and are thereby delivered to a conventional roll press 84, which impresses an outer surface with a suitable embellishing design, such as for example, a roughened surface resembling the surface or bark of a tree, as best shown in Figure 3. It is possible to embellish the outer surface of the extruded strip 76 within a short time after extrusion, as the extruded material remains soft and plastic for a period of about twenty minutes during which time any embellishment can be produced thereon.

The ornamental pieces 80 are now ready to be coated with a combustible moisture proof coating material to prevent them from disintegrating when stored in a damp place, sprayed with water, as by rain, etc. Referring now to Figure 2, there is shown one method of applying a suitable outer protective coating to the embellished sections 80, which consists of immersing the sections 80 into a quantity of coating material 82 contained in a tank 84 while the same is held and manipulated by means of a conventional pair of manipulating tongs 86. In Figure 4, there is shown another method of applying a suitable outer protective coating to the embellished sections 80, which consists of spraying the outer surfaces thereof with the coating material 90 by means of a conventional paint spray gun 92.

Referring now to Figure 5, there is shown a modified method of compacting the compounded material or admixture into logs or briquets of fireplace size. In this method, the admixture 93 is placed in a hollow mold 95, which can be of any desired shape, but one of cylindrical shape has been employed for the purposes of illustration in the drawing. The mold 95 is closed at one end by means of a removable base plug 97, and the admixture 93 is deposited therein to be compressed by means of a conventional hydraulic press or ram 99, which forces the material into a compacted mass against the base plug 97. The internal surface of the mold 95 may be provided, if desired, with any suitable surface ornamentation, such as for example, a design which will reproduce a surface ornamentation simulating the bark or outer surface of a tree. The compressing force required to compress the admixture will depend upon a number of factors, viz: the desired density of the finished log or briquet, the size and type of log to be made, the amount of moisture in the admixture, the type of nodulated paper, the type of binding agent, etc. These factors are all so variable that no accurate table of pressure may be given as an exact guide herein. In our co-pending application, containing claims to the product produced herein, we have given detailed data on the ingredients and, using such ingredients, we found that a pressure between one thousand and eighteen hundred pounds per square inch was required to produce logs or briquets having a density between 1 and 1.1 and a weight between sixty and sixty-five pounds per cubic foot.

In Figure 6 there is shown diagrammatically another method of making fireplace logs or briquets from nodulated paper particles coated with a suitable binding agent. This modified method consists of processing the admixture in a conventional roll press to form logs or briquets of the desired size and shape. The admixture 102 is deposited in a hopper 104, which feeds its contents by gravity between opposing rolls 106 and 108, which are driven in opposite directions as indicated by the arrows. Each roll 106 and 108 is provided with a series of circumferentially spaced hollow pockets 110, which are of semi-circular shape and at their point of tangency become aligned to form a cylindrical hollow chamber or recess 111 in which the material 102 is compressed. The internal surface areas of each of the pockets 110 of each of the rolls 106 and 108 may be suitably engraved or embossed with a design which will be reproduced on the surface area of the compacted logs or briquets 112. After the admixture 102 is compressed or compacted within the aligned pockets or recess 111 into the form of a cylindrical log or briquet, the same is released and dropped onto a conveyor 114 as the chamber 111 separates into individual pockets 110 with further movement of the rolls 106 and 108. The conveyor 114 serves to convey away the logs or briquets 112 to a suitable coating station (not shown).

Referring now to Figure 7, there is shown another modified method of forming a series of logs or briquets by extrusion. In this method a part of the ground or nodulated paper is treated with a suitable binding agent, as previously described, and the remainder of the paper particles are left untreated. A predetermined or measured quantity of a relatively large amount of treated nodulated paper particles or admixture is positioned in a hopper 120 and fed by gravity into a conventional extruding machine 122. As the last portion of the admixture is entering the extruding machine 122, a relatively small quantity of untreated dry nodulated paper particles is deposited in the hopper 120 to gravitate into the machine 122. By repeating this cycle indefinitely with an alternate feeding of a relatively large quantity of treated admixture and a relatively small quantity of untreated paper particles, a continuous strip of material 123 will be extruded from the machine 122 with relatively large sections of conglutinated admixture 124 and relatively narrow sections of untreated paper particles 126. By the term a relatively large amount of conglutinated admixture, it is meant that quantity of admixture necessary to produce a log or briquet of the desired size and density, and by the term relatively small quantity of untreated dry shredded paper particles, it is meant that quantity necessary to produce a relatively thin section 126 of untreated material in the continuously extruded strip 123. By this method of manufacture, a continuously extruded strip 123 is deposited by the extrusion machine onto the conveyor 128, which will be readily separable into individual logs or briquets 130 of the desired length through the sections made up of untreated paper particles 126. It will be found that the untreated nodulated paper particles 126 will pick up enough binding agent in passing through the extrusion machine 122 to remain form-retaining in the supported continuously extruded strip 123, but that the sections 126 of untreated shredded paper will not become compacted enough under the pressure of extrusion to prevent ready separation without the aid of auxiliary cutting tools or devices.

In Figure 8 there is shown another modification of the method of the invention, which can be advantageously employed in the making of a series of logs or briquets by extruding an admixture of nodulated paper particles mixed or treated with a suitable binding agent. In this modification, the nodulated paper particles treated with the binding agent are continuously fed into the mixing hopper 131 of a conventional extruding machine 133. By stopping the extruding machine 133 at predetermined time intervals, or by operating the extruding machine 133 intermittently, a transverse crack 135 will be formed in the continuously extruded strip 137 at regular spaced intervals, which will so greatly weaken the strip 137 that it will be readily separable into individual sections or units transversely along the planes of said transverse cracks 135. A conveyor 139 supports the strip 137 as it is extruded from the extruding machine 133.

Referring now to Figure 9, there is shown a modified form of log or briquet that is provided with a series of small radial fissures, cracks or splits 142, which are open on the surface and extend radially inwardly of the compacted mass. The fissures 142 become filled with air from the surrounding atmosphere, and this air greatly facilitates combustion of the material during burning. These fissures 142 can be formed in any number of different ways. In the method illustrated in Figure 5, they may be formed by alternately placing a small quantity of the admixture 93 in the hollow mold 95 and compressing, adding another small quantity of admixture and compressing again, and by repeating the cycle until the mold 95 has been filled to the extent necessary to form a log 140 of the desired size. They can also be formed in the extruded strips 126 and 137 of Figures 7 and 8, respectively, by mounting the feed screw of the extruding machine eccentrically. Another method found satisfactory in an extrusion operation is to operate the extrusion machine intermittently, or in a pulsating manner with a varying degree of pressure, speed, etc. It has been found that any one of these methods will produce satisfactory small fissures 142 throughout the surface area of an extruded strip.

Since the details of preparing the paper, particle sizes desirable, binding material formulas, coating material formulas, temperatures, pressures and densities of the various type of logs or briquets are relatively unimportant from the standpoint of the several methods of making the logs or briquets shown and described in this application, and since all of these data are described in detail in our co-pending application aforementioned, reference is hereby made to it again with the same force and effect as though such subject-matter was included herein at length and made a part hereof.

The logs or briquets, after being extruded and separated into individual sections of the desired length by cutting or any other suitable method, are treated in the following manner in order to make them water or moisture resistant. The logs or briquets after cutting are dried or heat treated in any suitable manner to remove the moisture from their surface to a depth of from one-eighth to one-quarter of an inch. They are now ready to be dipped or coated with a solution of water silicates having a water content between seventy-five and eighty percent. After coating the logs or briquets with the water silicate solution, they are again dried or heat treated until their surface is dry and non-tacky. The re-dried logs or briquets are now dipped or sprayed again with a water-resisting solution consisting of a natural resin, gum or plastic, mixed with a mineral oil in the proportion by weight of four to one. Obviously, the water-resisting solution must be heated above the melting temperature of the resin, gum or plastic, used, but it has been found that it should not be heated to a temperature greater than forty degrees C. above the melting point of the particular resin, gum or plastic, used.

After the logs or briquets have been treated by dipping and/or spraying with the water-resisting solution, it will be found that the silicates, resin, gum or plastic, contained therein will have formed minute particles on the surface thereof, which particles, after progressive heat treatments as above described, will tend to melt and join together to form a continuous thin sheet or coating that is substantially impervious to moisture.

The term "paper" wherever used throughout the specification and claims shall be interpreted generically, and shall include old and/or new paper, boxboard and/or pulp board, and/or combinations thereof, in any and all forms.

Although we have only described several embodiments of our invention, it will be apparent to those skilled in the art that the invention is not so limited, but that various other modifications may be made therein without departing from the spirit thereof or from the scope of the appended claim.

What we claim is:

The method of converting paper into artificial fuel in the form of logs or briquets which comprises the steps of nodulating the paper to a relatively fine state, mixing the nodulated paper particles with a binding agent, continuously extruding the resultant admixture under pulsating varying pressures into a solid form-retaining mass having a series of spaced radial fissures therein, and cutting the mass into individual sections.

RALPH O. WILLIAMS.
VLADIMIR BREDLIK.

REFERENCES CITED

The following references are of record in the file of this patent:

UNITED STATES PATENTS

| Number | Name | Date |
| --- | --- | --- |
| 1,050,535 | Hartung | Jan. 14, 1913 |
| 1,376,706 | Kratochwill | May 3, 1921 |
| 1,572,629 | Welton | Feb. 9, 1926 |
| 1,625,133 | Mohler | Apr. 19, 1927 |
| 1,914,271 | McCarron | June 13, 1933 |
| 1,926,578 | Brown | Sept. 12, 1933 |
| 1,977,890 | Ohlwiler | Oct. 23, 1934 |

OTHER REFERENCES

Rodgers: "Thermal and Physical Properties of Fuel Briquettes Made from Agricultural and Other Waste Products," Agricultural Engineering, May 1936, vol. 17, No. 5.